United States Patent
Plourde et al.

(10) Patent No.: US 6,981,936 B2
(45) Date of Patent: Jan. 3, 2006

(54) METHOD FOR MAKING SLIDER END STOPS ON ZIPPERS FOR RECLOSABLE PACKAGING

(75) Inventors: Eric Paul Plourde, Homewood, IL (US); James H. Pool, Lake Forest, CA (US)

(73) Assignee: Illinois Tool Works Inc., Glenview, IL (US)

( * ) Notice: Subject to any disclaimer, the term of this patent is extended or adjusted under 35 U.S.C. 154(b) by 65 days.

(21) Appl. No.: 10/213,385

(22) Filed: Aug. 5, 2002

(65) Prior Publication Data

US 2004/0022460 A1 Feb. 5, 2004

(51) Int. Cl.
*B31B 1/90* (2006.01)

(52) U.S. Cl. .......................................... 493/214; 53/412
(58) Field of Classification Search .................. 53/431, 53/133.4, 139.2, 550, 551, 552, 412; 493/213–215, 493/927
See application file for complete search history.

(56) References Cited

U.S. PATENT DOCUMENTS

| | | | |
|---|---|---|---|
| 5,088,971 A | 2/1992 | Herrington | 493/203 |
| 5,161,286 A | 11/1992 | Herrington, Jr. et al. | 24/387 |
| 5,448,807 A | 9/1995 | Herrington | 24/399 |
| 5,833,791 A | 11/1998 | Bryniarski et al. | 156/244.25 |
| 5,836,056 A | 11/1998 | Porchia et al. | 24/400 |
| 5,924,173 A | 7/1999 | Dobreski et al. | 24/400 |
| 5,950,285 A | 9/1999 | Porchia et al. | 24/400 |
| 5,956,924 A * | 9/1999 | Thieman | 53/412 |
| 6,036,796 A | 3/2000 | Halbert et al. | 156/64 |
| 6,186,663 B1 | 2/2001 | Ausnit | 383/63 |
| 6,209,287 B1 * | 4/2001 | Thieman | 53/412 |
| 6,287,001 B1 | 9/2001 | Buchman | 383/64 |
| 6,357,914 B1 | 3/2002 | Kinigakis et al. | 383/64 |

* cited by examiner

*Primary Examiner*—John Paradiso
(74) *Attorney, Agent, or Firm*—Ostrager Chong Flaherty & Broitman P.C.

(57) ABSTRACT

A method of making slider end stops on zippers comprising two interlockable profiled closure members. The method comprises the steps of: opening a section of a zipper tape to form a gap between the profiled closure members; inserting a first portion of a body into the gap with a second portion of the body projecting above the tops of the profiled closure members; and joining the first portion of the body to adjoining sections of the profiled closure members. Then the body is narrowed down the middle to form a neck where the zipper tape will later be cut, each half of the body forming a respective slider end stop, but on different zipper segments. Alternatively, two bodies can be inserted into the gap and then joined to adjoining sections of the closure members. The zipper tape is cut between the two bodies, which will ultimately form respective slider end stops on different zipper segments. In an alternative embodiment, the zipper tape and the bag making film can be integrally formed.

25 Claims, 4 Drawing Sheets

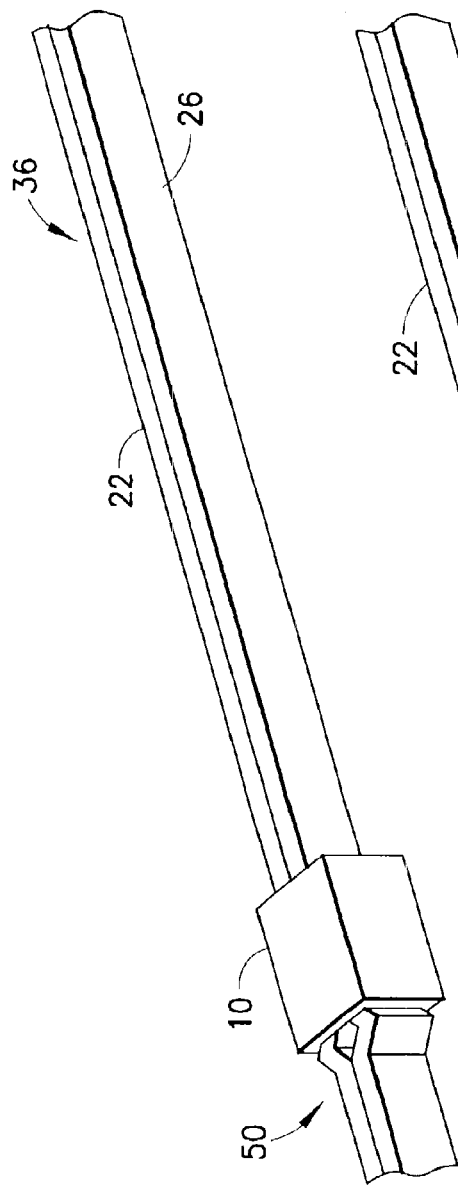
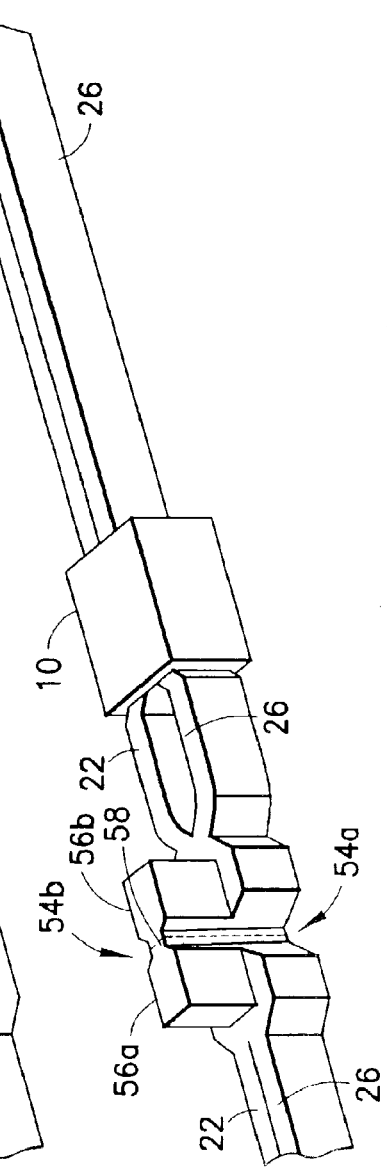
FIG. 2  FIG. 3  FIG. 4

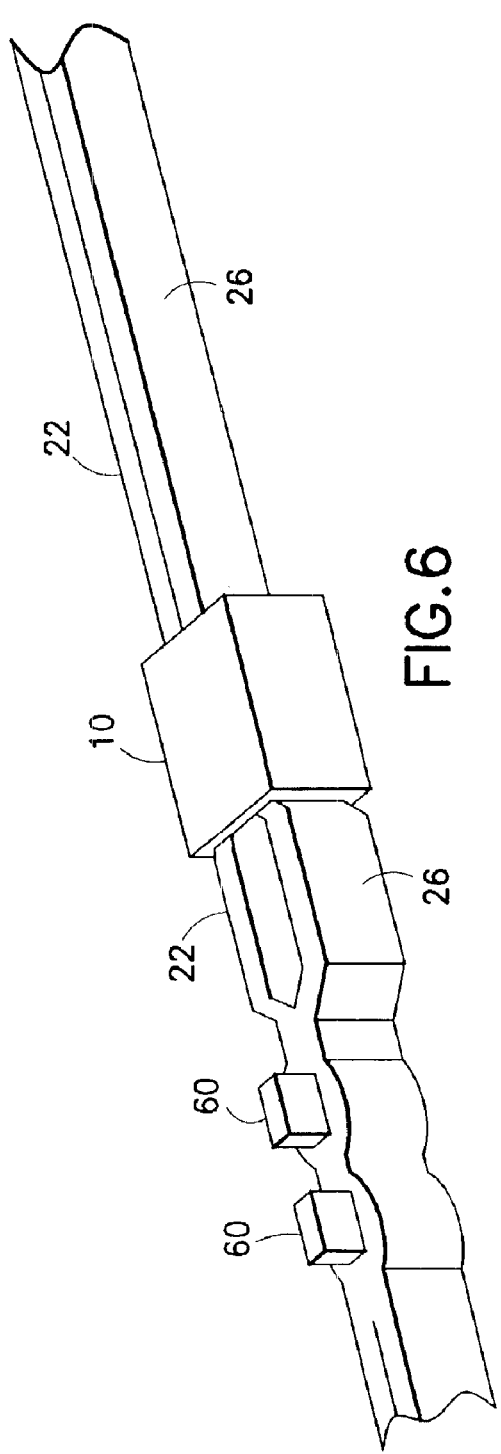
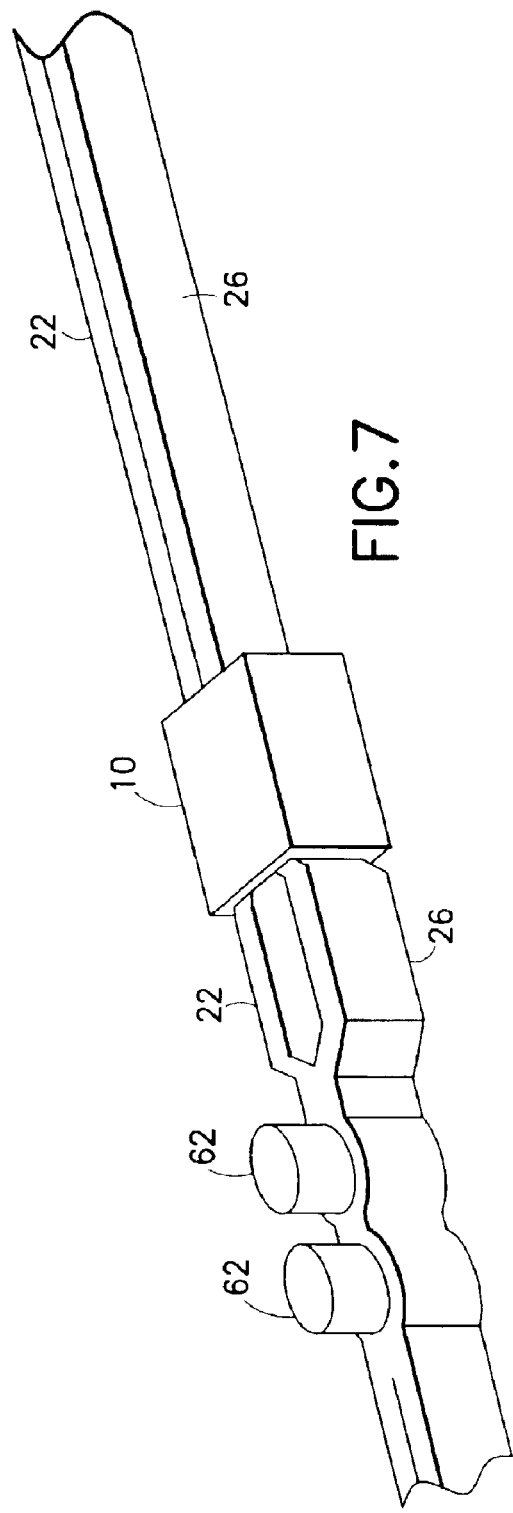

METHOD FOR MAKING SLIDER END STOPS ON ZIPPERS FOR RECLOSABLE PACKAGING

BACKGROUND OF THE INVENTION

This invention generally relates to methods and apparatus for manufacturing slider-operated flexible zippers for use in reclosable pouches, bags or other packages of the type in which material, such as foodstuff and detergent, are stored.

Reclosable bags are finding ever-growing acceptance as primary packaging, particularly as packaging for foodstuffs such as cereal, fresh vegetables, snacks and the like. Such bags provide the consumer with the ability to readily store, in a closed, if not sealed, package any unused portion of the packaged product even after the package is initially opened. To gain acceptance as a primary package for foodstuffs, it is virtually mandatory that the package exhibit some form of tamper evidence to protect the consumer and maintain the wholesomeness of the contained product. In addition, in many cases it is necessary that food product be hermetically packaged.

Reclosable fastener assemblies are useful for sealing thermoplastic pouches or bags. Such fastener assemblies often include a plastic zipper and a slider. Typically, the plastic zippers include a pair of interlockable profiled members that form a closure. As the slider moves across the profiles, the profiles are opened or closed. The profiles in plastic zippers can take on various configurations, e.g. interlocking rib and groove elements having so-called male and female profiles, interlocking alternating hook-shaped closure members, etc. Reclosable bags having slider-operated zippers are generally more desirable to consumers than bags having zippers without sliders because the slider eliminates the need for the consumer to align the interlockable zipper profiles before causing those profiles to engage.

In one type of slider-operated zipper assembly, the slider straddles the zipper and has a separating finger at one end that is inserted between the profiles to force them apart as the slider is moved along the zipper in an opening direction. The other end of the slider is sufficiently narrow to force the profiles into engagement and close the zipper when the slider is moved along the zipper in a closing direction. Other types of slider-operated zipper assemblies avoid the use of a separating finger. For example, U.S. Pat. No. 6,047,450 discloses a zipper comprising a pair of mutually interlockable profiled structures, portions of which form a fulcrum about which the profiled structures may be pivoted out of engagement when lower edges of the bases are forced towards each other.

One of the important features of such reclosable fastener assemblies is the end stop, which prevents the slider from falling off when the slider reaches the end of the fastener. A slider end stop is provided on each end of the zipper. End stops have taken on various configurations, such as, for example, riveted end clamps such as those described in U.S. Pat. Nos. 5,067,208 and 5,161,286; transverse end stops made from molten material of the fastener strips, as described in U.S. Pat. No. 5,088,971; reciprocating anvils, as described in U.S. Pat. No. 5,131,121; tubular end stops, as described in U.S. Pat. No. 5,405,478; a window structure combined with sealed zipper ends, as described in U.S. Pat. No. 5,442,837; or plastic end clips fused to the zipper as described in U.S. Pat. No. 5,448,807.

U.S. Pat. No. 5,950,285 discloses a reclosable bag having end stops designed to prevent a slider from being pulled off the end of the zipper. The end stops are formed from the material of the zipper profiles and "rise vertically" from the zipper for the purpose of blocking further movement of the slider. The end stops are formed by first aligning together the opposing profiles at an end stop area proximate to an end of the bag, and then fusing the zipper profiles at the end stop area to provide a vertical structure, while at the same time keeping the base of the profiles intact so that the slider cannot lift off of the zipper in the parked position. Preferably, the profiles are fused by directing ultrasonic energy to the end stop areas.

A slider end stop must be designed to withstand the force applied by a consumer during normal use. More specifically, as the consumer pulls the slider to either end of the zipper, the end stop should not bend, fold, collapse or otherwise lose its ability to stop the slider when the slider is pressed against the end stop with the pulling force being exerted by the consumer. Preferably a slider end stop has relatively high slider pull-off resistance.

There is a need for improvements in the manufacture and construction of slider end stops for slider-operated zippers. In particular, there is a need for an improved, yet economical method of making a slider end stop having high slider pull-off resistance.

BRIEF DESCRIPTION OF THE INVENTION

The invention is directed to method of making slider end stops on zippers for reclosable packaging. The invention is further directed to zipper structures having relatively high slider pull-off resistance, and to reclosable packages incorporating such zippers.

One aspect of the invention is a method of making slider end stops on a zipper tape comprising first and second interlockable profiled closure members, the method comprising the following steps: inserting a first portion of a piece of material into a gap between opposing sections of the first and second profiled closure members with a second portion of the piece of material projecting above the tops of the first and second profiled closure members; and joining the first portion of the piece of material to the first and second profiled closure members.

Another aspect of the invention is a method of making slider end stops on a zippered package, comprising the following steps: integrally forming a web of bag making film having first and second profiled closure members that form a zipper; folding the web to bring the first and second profiled closure members into proximity with each other; inserting a first portion of a piece of material into a gap between opposing sections of the first and second closure members, with a second portion of the piece of material projecting above the tops of the first and second profiled closure members; and joining the first portion of the piece of material to the first and second profiled closure members.

A further aspect of the invention is a zipper tape comprising first and second interlockable profiled closure members that are joined at spaced intervals along the length of the zipper tape, each zone of joinder having portions of a respective pair of slider end stop posts embedded therein, both slider end stop posts of each pair projecting above the tops of the first and second profiled closure members.

Another aspect of the invention is a slider-zipper assembly comprising: first and second zipper parts joined along first and second end sections of the zipper and interlockable along an intermediate section of the zipper disposed between the first and second end sections, the first zipper part comprising a first profiled member extending along the intermediate section and the second zipper part comprising a second profiled member extending along the intermediate section, the first and second profiled members being mutually interlockable; a first slider end stop post having a first portion embedded in the first end section and a second portion projecting above the tops of the first and second profiled members; a second slider end stop post having a first portion embedded in the second end section and a second portion projecting above the tops of the first and second profiled members; and a slider mounted to the intermediate section of the zipper and movable between the first and second slider end stop posts.

Yet another aspect of the invention is a reclosable package comprising a receptacle, a flexible zipper joined to or integrally formed with the receptacle and a slider mounted to the zipper, wherein the flexible zipper comprises: first and second zipper parts joined along first and second end sections of the zipper and interlockable along an intermediate section of the zipper disposed between the first and second end sections, the first zipper part comprising a first profiled member extending along the intermediate section and the second zipper part comprising a second profiled member extending along the intermediate section, the first and second profiled members being mutually interlockable; a first slider end stop post having a first portion embedded in the first end section and a second portion projecting above the tops of the first and second profiled members; and a second slider end stop post having a first portion embedded in the second end section and a second portion projecting above the tops of the first and second profiled members. The slider is mounted to the intermediate section of the zipper and movable between the first and second slider end stop posts.

Other aspects of the invention are disclosed and claimed below.

BRIEF DESCRIPTION OF THE DRAWINGS

FIGS. 2–4 are drawings showing isometric views of portions of a zipper tape with slider at various stages in the making of end stops in accordance with one embodiment of the invention.

FIG. 6 is a drawing showing an isometric view of portions of a zipper tape with slider after end stop formation in accordance with a second embodiment of the invention.

FIG. 7 is a drawing showing an isometric view of portions of a zipper tape with slider after end stop formation in accordance with a third embodiment of the invention.

DETAILED DESCRIPTION OF THE INVENTION

Figure 1:
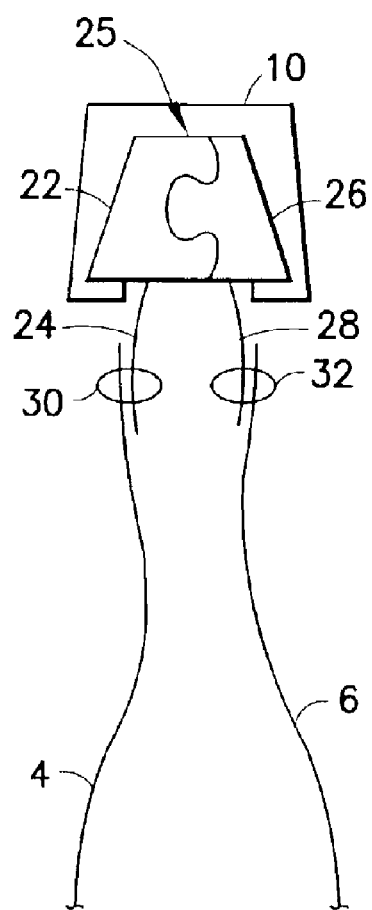
FIG. 1 is a drawing showing a sectional view of one type of reclosable bag having a slider.

Reference will now be made to the drawings, in which similar elements in different drawings bear the same reference numerals. For the purpose of illustration, one embodiment of the invention will be described with reference to a reclosable package of the type depicted in FIG. 1. However, application of the slider end stop formation technique of the present invention is not limited to reclosable bags of the type shown in FIG. 1. For example, the reclosable bag may incorporate other types of slider-zipper assemblies. Also the zipper can be integrally formed with the bag making film, instead of having flanges that are joined to the bag making film, as is depicted in FIG. 1.

FIG. 1 is a general depiction of one type of conventional reclosable bag 2 incorporating a slider 10 and a zipper 25 of the above-described types. The bag 2 comprises a front wall 4 and a rear wall 6 integrally connected at a fold line situated at the bottom of the bag. Although not shown in FIG. 1, the walls 4 and 6 are also joined at the sides of the package, at least from the bottom to the slider end stops on the zipper by respective side seals. The bag walls 4 and 6 are formed of a suitable plastic film material for the product to be contained within the package. For example, the film may be a laminate or coextrusion comprising a gas barrier layer and/or a low-melting-point sealant layer.

The zipper 25 comprises a closure member 22 having a female profile and a closure member 26 having a male profile that interlocks with the female profile in the zipper section being closed as the slider travels in the closing direction. The zipper 25 further comprises a zipper flange 24 having one end connected or joined to closure member 22 and a zipper flange 28 having one end connected or joined to closure member 26.

As seen in FIG. 1, zipper flange 24 is secured to the bag front wall 4 by a permanent seal 30 proximal to the top of the bag, while zipper flange 28 is secured to the bag rear wall 6 by a permanent seal 32. The permanent seals 30 and 32 are indicated by ovals. It should be appreciated that each permanent seal is a band of joined, e.g., fused, material that extends from one side seal of the bag to the other side seal, thereby securing the zipper to the bag along the width of the bag. The permanent seals 30 and 32 are generally parallel to each other and may be formed by any conventional method, such as conduction heat sealing.

It is known to apply a slider-operated zipper to a web of bag making film as the film is being advanced toward a form-fill-seal (FFS) machine. In one known system, a zipper tape is unwound from a spool and advanced to a device for joining the closure members of the zipper tape together e.g., by crushing or ultrasonic stomping. The stomped zipper tape is then advanced to a slider insertion device, which inserts a respective slider on each increment of zipper corresponding to the length of the zipper in the reclosable package. Then the zipper tape with inserted sliders is advanced toward the zipper tape application station, where one zipper length or segment will be severed from the remainder of the zipper tape and joined to bag making film that has been unwound from a roll and is being fed under tension to the FFS machine.

FIG. 2 depicts the final result of the slider insertion operation, namely, a slider 10 clipped onto the interlocked closure members 22 and 26 of a zipper tape 36. (The zipper flanges have been omitted from FIG. 2 and later drawings.)

One embodiment of a method for making slider end stops on a zipper tape will now be described with reference to FIGS. 3 and 4. After the slider has been inserted and the zipper tape has been activated, the slider 10 is moved in the opening direction a sufficient distance to form a gap between the profiled closure members 22 and 26, the gap being wide enough and long enough to receive a piece of material 52. The piece 52 may be made of the same material as the zipper tape or a different material, for example, a plastic material that is stiffer than the plastic material of the zipper tape. Alternatively, the piece 52 may comprise a core of relatively stiffer plastic material and a shell of the same material as that of the zipper tape to facilitate leakproof sealing of piece 52 to the zipper tape. The piece 52 depicted in FIG. 3 has a bar shape with right-angled corners. The piece 52 must have a length sufficient to form two slider end stops while its height is greater than the height of the zipper profile. The piece 52 is inserted in the gap such that one portion of the piece is inserted into the gap while a second portion of the piece 52 projects above the tops of said profiled closure members 22 and 26, as seen in FIG. 3.

In the next step of the method of manufacture (depicted in FIG. 4), the inserted portion of the piece 52 of material is joined to the adjoining sections of the profiled closure members 22 and 26, e.g., by application of heat and pressure, crushing, fusion welding, or ultrasonic stomping. At the same time the piece 52 of material can be shaped, e.g., by deforming the material to form a pair of indentations 54a and 54b on opposing sides of a strip-shaped zone located in the middle of piece 52 and oriented vertically. The end result of this shaping is a pair of slider end stop posts 56a and 56b connected by a neck. As explained below, ultimately the piece 52 will be severed into two pieces by cutting through the neck. The cut is indicated by dashed line 58 in FIG. 4. The thinned material along the neck facilitates the cutting operation. Pieces 56a and 56b seen in FIG. 4 will form slider end stops on different packages.

After shaping of piece 52, the zipper tape 36 is advanced one zipper increment and the end stop formation process is repeated. In this manner a zipper tape is made that has a respective necked piece of material inserted along the zipper tape at regular intervals, the necks being separated by a distance equal to one zipper increment, i.e., the length of the zipper in each package. A respective slider is inserted on each zipper increment, each slider being movable along a length of zipper tape bounded at opposing ends by respective slider end stop posts.

Figure 5:
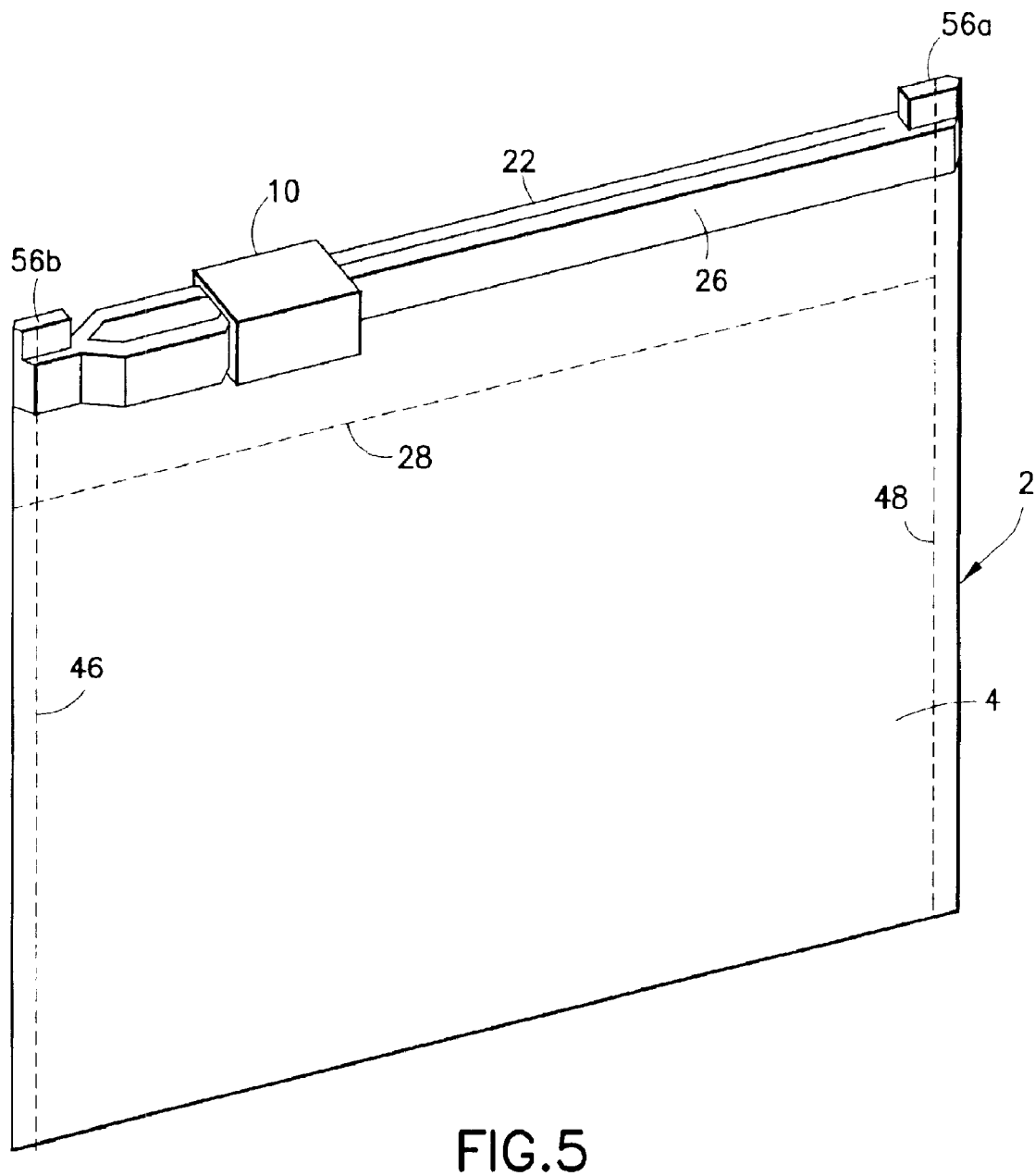
FIG. 5 is a drawing showing an isometric view of a reclosable bag having slider end stops manufactured in accordance with the method depicted in FIGS. 2–4.

The pre-formed zipper tape is fed to a slider-zipper assembly application station, where the zipper tape is cut along line 58 (see FIG. 4) to sever a zipper from the remainder of the zipper tape. At the same time, the zipper is attached to the bag making film. The bag making film with attached slider-zipper assemblies is fed to a FFS machine where the package is formed, filled and sealed in conventional fashion. One exemplary reclosable package 2 is depicted in FIG. 5. The zipper in this example is attached to the bag making film by joining the zipper flanges (only flange 28 is shown) to the top edges of the opposing walls of the film (only wall 4 is shown). A receptacle is formed by cross sealing (e.g., by conduction heat sealing) the opposing walls of bag making film at package width intervals along the web of film. Each cross seal is a band-shaped zone that is generally transverse to the zipper tape and runs the full height of the film in each package. After the receptacle is filled (e.g., on a VFFS machine), the filled package is severed from the remainder of the web of film by cutting along a line that bisects the band-shaped zone of the cross seal and that cuts the neck of piece 52 of material (see FIG. 4) along line 58. The end result is a package (seen in FIG. 5) having a pair of side seals 46 and 48 on opposing sides of the package 2 and a pair of slider end stops 56a and 56b on opposing ends of the zipper. The slider is movable along the zipper between a zipper-closed park position adjacent one end stop and a zipper-fully-open park position adjacent the other slider end stop. The end stops 56a and 56b prevent the slider from being pulled off of either end of the zipper.

In accordance with alternative embodiments of the invention, a pair of slider end stops can be formed by inserting separate pieces of material (i.e., separate bodies) rather than inserting a wider piece of material (i.e., a wider body) and then splitting the wide piece in two. Two exemplary embodiments are shown in FIGS. 6 and 7.

In FIG. 6 each slider end stop post 60 is a respective bar-shaped piece of material, both bars being embedded in a section where the zipper profiles are later joined in one of the manners previously described. The bars are spaced apart and the zipper profiles are joined in the interstice as well as along the section adjacent the leading end of the first bar and the section adjacent the lagging end of the second bar (the terms "leading" and "lagging" being used with reference to the direction of zipper tape advancement). Ultimately the zipper tape will be cut between the bar-shaped posts 60 when a zipper is severed from the remainder of the zipper tape.

The embodiment shown in FIG. 7 differs from the embodiment shown in FIG. 6 only in that each slider end stop post 62 is rod-shaped instead of bar-shaped. However, a person skilled in the art will appreciate that the posts may have many different cross-sectional shapes, for example, square, rectangular, trapezoidal, pentagonal, hexagonal, octagonal, circular, elliptical, oval, triangular, etc. In the case of polygonal shapes, the slider end stop posts should preferably be disposed such that they present a flat surface rather than an edge at the point where slider impingement occurs.

As previously mentioned, the invention also encompasses reclosable bags in which bag making film and first and second interlockable profiled closure members are integrally formed, e.g., by extrusion. The bag making film is then folded in a manner that aligns the first and second closure members in opposition to each other. A first portion of a body is inserted into a gap between adjoining sections of the first and second closure members, with a second portion of the body projecting above the tops of the first and second profiled closure members. Then the first portion of the body is joined to the adjoining sections of the first and second profiled closure members, thereby embedding the body in the closure profiles. Preferably, the closure members of the zipper are engaged before the joining step. The body can be cut to form slider end posts embedded in the joined closure members of adjacent zipper segments, using the technique shown in FIG. 4. Also, separate posts can be inserted side by side, as shown in the alternative embodiments depicted in FIGS. 6 and 7.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

As used in the claims, the verb "joined" means fused, bonded, sealed, or adhered, whether by application of heat and/or pressure, application of ultrasonic energy, application of a layer of adhesive material or bonding agent, interposition of an adhesive or bonding strip, etc.

What is claimed is:

1. A method of making slider end stops on a zipper tape comprising first and second interlockable profiled closure members, said method comprising the following steps:

inserting a first portion of a first piece of material into a first gap between opposing sections of said first and second profiled closure members with a second portion of said first piece of material projecting above the tops of said first and second profiled closure members; and joining said first portion of said first piece of material to said first and second profiled closure members.

2. The method as recited in claim 1, further comprising the steps of inserting a slider onto said zipper tape before said joining step and moving said slider in an opening direction to create said gap.

3. The method as recited in claim 1, further comprising the step of cutting said zipper tape along a cut line that intersects said first piece of material.

4. The method as recited in claim 3, further comprising the step of narrowing the thickness of a middle zone of said first piece of material that extends generally transverse to said zipper tape prior to said cutting step, said cut line intersecting said narrowed middle zone.

5. The method as recited in claim 3, further comprising the step of forming said first piece of material to comprise first and second bodies connected by a neck, said cut line intersecting said neck.

6. The method as recited in claim 1, further comprising the following steps:

joining said zipper tape to opposing walls of bag making film;

joining said opposing walls of bag making film to each other in a band-shaped zone that is generally transverse to said zipper tape and is aligned with said first piece of material; and cutting said film and said zipper tape along a cut line that cuts said band-shaped zone and said first piece of material.

7. The method as recited in claim 1, wherein said first piece of material is bar-shaped.

8. The method as recited in claim 1, wherein said first piece of material is rod-shaped.

9. The method as recited in claim 1, further comprising the following steps:

inserting a first portion of a second piece of material into a second gap between opposing sections of said first and second profiled closure members with a second portion of said second piece of material projecting above the tops of said first and second profiled closure members; and joining said first portion of said second piece of material to said first and second profiled closure members.

10. The method as recited in claim 9, further comprising the steps of cutting said zipper tape along first and second cut lines that respectively intersect said first and second pieces of material, thereby forming a zipper segment.

11. The method as recited in claim 10, further comprising the step of inserting a slider on said zipper segment.

12. The method as recited in claim 1, further comprising the following steps:

inserting a first portion of a second piece of material into said first gap with a second portion of said second piece of material projecting above the tops of said first and second profiled closure members; and joining said first portion of said second piece of material to said first and second profiled closure members.

13. The method as recited in claim 12, further comprising the step of cutting said zipper tape along a cut line that lies between said first and second pieces of material.

14. The method as recited in claim 1, wherein said zipper tape is made of a material different than said first piece of material.

15. A method of making slider end stops on a zippered package, comprising the following steps:

integrally forming a web of bag making film having first and second profiled closure members that form a zipper;

folding said web to bring said first and second profiled closure members into proximity with each other;

inserting a first portion of a first piece of material into a first gap between opposing sections of said first and second closure members, with a second portion of said first piece of material projecting above the tops of said first and second profiled closure members; and joining said first portion of said first piece of material to said first and second profiled closure members.

16. The method as recited in claim 15, wherein said first piece of material is bar-shaped.

17. The method as recited in claim 15, wherein said first piece of material is rod-shaped.

18. The method as recited in claim 15, wherein said first piece of material and said zipper are made of different materials.

19. The method as recited in claim 15, further comprising the following steps:

joining opposing walls of said bag making film to each other in a band-shaped zone that is generally transverse to said zipper and is aligned with said first piece of material; and cutting said film and said zipper along a cut line that cuts said band-shaped zone and said first piece of material.

20. The method as recited in claim 19, further comprising the step of forming said first piece of material to comprise first and second bodies connected by a neck, said neck being cut during said cutting step.

21. The method as recited in claim 15, further comprising the following steps:

inserting a first portion of a second piece of material into a second gap between opposing sections of said first and second profiled closure members with a second portion of said second piece of material projecting above the tops of said first and second profiled closure members; and joining said first portion of said second piece of material to said first and second profiled closure members.

22. The method as recited in claim 21, further comprising the steps of cutting said film and said zipper along first and second cut lines that respectively intersect said first and second pieces of material.

23. The method as recited in claim 15, further comprising the step of inserting a slider on said zipper.

24. The method as recited in claim 15, further comprising the following steps:

inserting a first portion of a second piece of material into said first gap with a second portion of said second piece of material projecting above the tops of said first and second profiled closure members; and joining said first portion of said second piece of material to said first and second profiled closure members.

25. The method as recited in claim 24, further comprising the step of cutting said film and said zipper along a cut line that lies between said first and second pieces of material.

* * * * *